UNITED STATES PATENT OFFICE.

EDWARD JOSEPH DE SMEDT, OF NEW YORK, N. Y., ASSIGNOR TO NEW YORK IMPROVED ANTHRACITE COAL COMPANY, OF SAME PLACE.

IMPROVEMENT IN COMPOSITION ROOFING, PAVING, &c.

Specification forming part of Letters Patent No. 101,594, dated April 5, 1870.

To all whom it may concern:

Be it known that I, EDWARD JOSEPH DE SMEDT, of the city, county, and State of New York, have invented a new and Improved Composition for Roofing, Paving, and Similar Purposes; and I do hereby declare that the following is a full, clear, and exact description of the same.

This invention relates to an improvement in compositions for roofing, paving, and similar purposes, which are composed, principally, of Trinidad bitumen or asphalt, and other asphalts obtained from the West India Islands.

The invention consists in hardening such compositions by adding to them the substances known as Ritchie mineral and Albertite, either or both, the latter-named substances being much harder and less fusible than the kind first mentioned, although all of them are asphalts.

The hard asphalts—to wit, the Ritchie mineral or Albertite—are reduced to a fine powder and added to the softer or more fusible asphalt, the Trinidad, when the latter is melted, the whole mass being well stirred, so that the ingredients will be thoroughly incorporated together. The soft asphalt fuses at about 212° Fahrenheit.

From forty to eighty per cent. of the soft Trinidad or other West India asphalt is added to from twenty to sixty per cent. of the hard asphalt—to wit, the Ritchie mineral or Albertite.

I would remark that a quantity of sand, gravel, broken stone, or other suitable substance may be added to the mass to give it the necessary body.

Having thus described my invention, what I claim as new, and desire to secure by Letters Patent, is—

The use of Ritchie mineral and Albertite, either or both, for the purpose of hardening Trinidad and other asphalts of a softer or more fusible nature than the two first named.

E. J. DE SMEDT.

Witnesses:
CHAS. SCHENK,
G. M. ACKERMAN.